(12) United States Patent
Gohara et al.

(10) Patent No.: US 7,574,101 B2
(45) Date of Patent: Aug. 11, 2009

(54) IMAGE EDITING APPARATUS, METHOD, AND PROGRAM

(75) Inventors: Koichi Gohara, Kanagawa (JP); Hiroshi Murakami, Kanagawa (JP); Kei Yamaji, Kanagawa (JP); Hajime Araya, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 883 days.

(21) Appl. No.: 11/106,691

(22) Filed: Apr. 15, 2005

(65) Prior Publication Data

US 2005/0238322 A1    Oct. 27, 2005

(30) Foreign Application Priority Data

Apr. 15, 2004    (JP)    ............... 2004-120445

(51) Int. Cl.
  G11B 27/00    (2006.01)
  H04N 5/93    (2006.01)
(52) U.S. Cl. .......................... 386/52; 386/125
(58) Field of Classification Search ............. 386/1, 386/45–46, 52, 55, 125, 126
  See application file for complete search history.

(56) References Cited

U.S. PATENT DOCUMENTS

2002/0110354 A1    8/2002    Ikeda et al.

2003/0202777 A1*    10/2003    Kogusuri ............ 386/95

OTHER PUBLICATIONS

"LiFE with-Photo-Cinema" by digitalstage inc., searched on Apr. 6, 2004, via the Internet, <URL: http://www.digitalstage.net/jp/product/life/index.html>.

* cited by examiner

Primary Examiner—Thai Tran
Assistant Examiner—Nigar Chowdhury
(74) Attorney, Agent, or Firm—Sughrue Mion, PLLC (57) ABSTRACT

An editing condition input screen of an image editing program is provided with a selecting button for selecting a basic scenario of a photo movie and a still image to be a material and is also provided with each button for performing priority designation for the image desired to be displayed by priority among the selected image and for performing key image designation. Further, a notable person designation button for performing notable person designation is provided. The image editing program, on the basis of such inputted editing conditions, evaluates and narrows down the material to produce the photo movie. By inputting the editing conditions, time assigned for a selected image within the photo movie becomes long and the selected image is repeatedly displayed, therefore the photo movie obtains a plot and a quality of the photo movie can be improved.

4 Claims, 8 Drawing Sheets

| | SCENE A | | | | | | SCENE B | | | | | | ... | SCENE D | | | | | | SCENE E | | | | | |
|---|---|---|---|---|---|---|---|---|---|---|---|---|---|---|---|---|---|---|---|---|---|---|---|---|---|
| TIME STAMP | t11 | t12 | t13 | t14 | t15 | t16 | t21 | t22 | t23 | t24 | t25 | t26 | | t41 | t42 | t43 | t44 | t45 | t46 | t51 | t52 | t53 | t54 | t55 | t56 |
| IMAGE ID | | PIC1 | | | | | | | PIC2 | | | | | | | PIC1a | | | | | | PIC1a | | | |
| IMAGE ID | | | | | | | | | | | | | | | | | | | | | | | PIC1b | | | |
| IMAGE ID | | | | | | | | | | | | | | | | | | | | | | | | | | |
| DECORATIVE IMAGE ID (TEMPLATE IMAGE, MASK IMAGE, ETC.) | | | | | | | | | | | | | | | | | DEC1 | | | | | | DEC2 | | |
| DECORATIVE IMAGE ID (TEMPLATE IMAGE, MASK IMAGE, ETC.) | | | | | | | | | | | | | | | | | | | | | | | | | |
| EFFECT 1 | | ZOOM IN | | | | | | | ZOOM OUT | | | | | | | REDUCE, ROTATE, AND MOVE | | | | | | REDUCE AND MOVE | | | |
| EFFECT 2 | | | | | | | | | | | | | | | | | | | | | | | ENLARGE AND MOVE | | |

IMAGE EDITING APPARATUS, METHOD, AND PROGRAM

BACKGROUND OF THE INVENTION

1. Field of the Invention

The present invention relates to an image edition/compile apparatus, an image editing method, and an image editing program for producing a photo movie by editing still images.

2. Description of the Related Art

A still image photographed by a digital still camera can be enjoyed by viewing by printing on a photographic paper and by loading image data into a personal computer (PC) and displaying on a monitor by using an image viewer software. In many cases, an image viewer software is provided with a slide show function, which displays still images by changing over the images at a predetermined time interval. By using such function, a user can easily enjoy a large number of still images.

Besides, as a method for viewing still images similar to such slide show, a photo movie is proposed as image sequence which reproduces still images just like a moving picture by using still images as materials and by editing the material (see, for example, U.S. Patent Application Publication No. 2002/0110354 and "LiFE*with-Photo-Cinema" by digital-stage inc., searched on Apr. 6, 2004, via the Internet, <URL: http://www.digitalstage.net/jp/product/life/index.html>). In a photo movie, motion is provided in still images by providing the still image with a special effect such as a zoom-in processing, which crops a portion of the still image and closes up such portion and panning processing, which moves an eye-point from one end of the still image to the other.

Such photo movie provides a new way of enjoying the still image different from conventional way of viewing still images, and attracts attention as one of the ways to reuse still images photographed and stored by the user.

U.S. Patent Application Publication No. 2002/0110354 and "LiFE*with-Photo-Cinema" respectively disclose an image editing software for producing a photo movie using still images as materials. Because both types of such image editing software are intended for use in a personal computer, any user who possesses a personal computer can use such software.

However, in an image editing software as described in U.S. Patent Application Publication No. 2002/0110354, an editing operation is very complicated because a reproduction order of still images should be designated and special effects should be designated per each still image.

Furthermore, in an image editing software as described in "LiFE* with-Photo-Cinema", as well as a manual mode, by which a detailed editing designation is made manually, there is provided an automatic mode, which produces a photo movie automatically by merely selecting images used as a material. In such an automatic mode, because all editing conditions, except image selection, are set by automatic setting by a computer, operation becomes very easy. However, in such an automatic mode, a quality of the photo movie often becomes flat because there is no precedence or difference in handling and editing of selected images: that is, for example, an assigned displaying time and the number of times of displaying an image are approximately even.

SUMMARY OF THE INVENTION

In view of the foregoing, an object of the present invention is to provide an apparatus, a method, and a program capable of producing an impressive high quality photo movie while reducing complication of operation.

In order to achieve the above and the other objects, an image edition/compile apparatus of the present invention includes a storage section, a basic scenario selection section, a reader, an image selection section, an editing condition setting section, and a photo movie production section. The storage section stores plural types of the basic scenario in which the basic editing condition of the photo movie is determined. The basic scenario selection section selects one basic scenario from among the plural types of basic scenario. The reader reads still images from a recording medium. The image selection section selects a desired still image from among the still images. The editing condition setting section adds the editing condition to the basic scenario. The editing condition to be added includes at least one of priority designation information for designating the still image to be used preferentially to other still images among the selected still images and key image designation information for designating a key image to be used in an important scene of the photo movie. The photo movie production section produces the photo movie on the basis of the basic scenario and the editing condition to be added.

It is preferable that the photo movie is produced so that a number of times of reproduction of the still image to which the priority designation or the key image designation is made is larger than a number of times of reproduction of other still images. The important scene is a climactic scene or a title scene of the photo movie.

It is preferable that an extraction section for extracting the still image including a notable person as a subject, by analyzing the still image, on the basis of notable person designation information for designating the notable person, is included. The notable person designation information is added to the basic scenario by the editing condition setting section.

It is preferable that the extraction section evaluates an image quality of the selected still images and determining whether the image quality satisfies a predetermined criterion. It is preferable that a still image to be used for the photo movie from among the selected still images, on the basis of a result of the evaluation and the editing condition to be added, is narrowed down for fine restriction. The photo movie is recorded on a recording medium.

An image editing method and program of the present invention includes the steps of selecting one basic scenario from among plural types of basic scenario and reading the still images from a recording medium. The basic scenario includes a basic editing condition of the photo movie.

The image editing method and program of the present invention further includes the steps of selecting a desired still image from the still images and adding the editing condition to the basic scenario. The editing condition to be added includes at least one of priority designation information for designating the still image to be used preferentially to other still images among the selected still images and key image designation information for designating a key image to be used in an important scene of the photo movie. The image editing method and program of the present invention further includes the step of producing the photo movie on the basis of the basic scenario and the editing condition to be added.

It is preferable that the photo movie is produced so that a number of times of reproduction of the still image to which the priority designation or the key image designation is made is larger than a number of times of reproduction of other still images. The important scene is a climactic scene or a title scene of the photo movie.

It is preferable that a still image including a notable person as a subject is extracted by analyzing the still image on the basis of notable person designation information for designating the notable person. The notable person designation information is added to the basic scenario by the editing condition setting section.

It is preferable that a still image including a notable person as a subject is extracted by analyzing the still image on the basis of notable person designation information for designating the notable person. It is preferable that a still image to be used for the photo movie is narrowed down from among the selected still images on the basis of a result of the evaluation and the editing condition to be added.

According to the present invention, one basic scenario is selected from among the plural types of basic scenario determining the basic editing condition of the photo movie, desired still images are selected from among the still images recorded on the recording medium, and the still image to be used preferentially to other still images among the selected still images and the key image to be used in the important scene of the photo movie to produce the photo movie. Therefore, the impressive high quality photo movie can be produced while reducing complication of operation.

BRIEF DESCRIPTION OF THE DRAWINGS

The above objects and advantages of the present invention will become apparent to a person skilled in the art from the following detailed description of the preferred embodiments of the invention when read in conjunction with the accompanying drawings, in which.

DETAILED DESCRIPTION OF THE PREFERRED EMBODIMENT(S)

Figure 1:
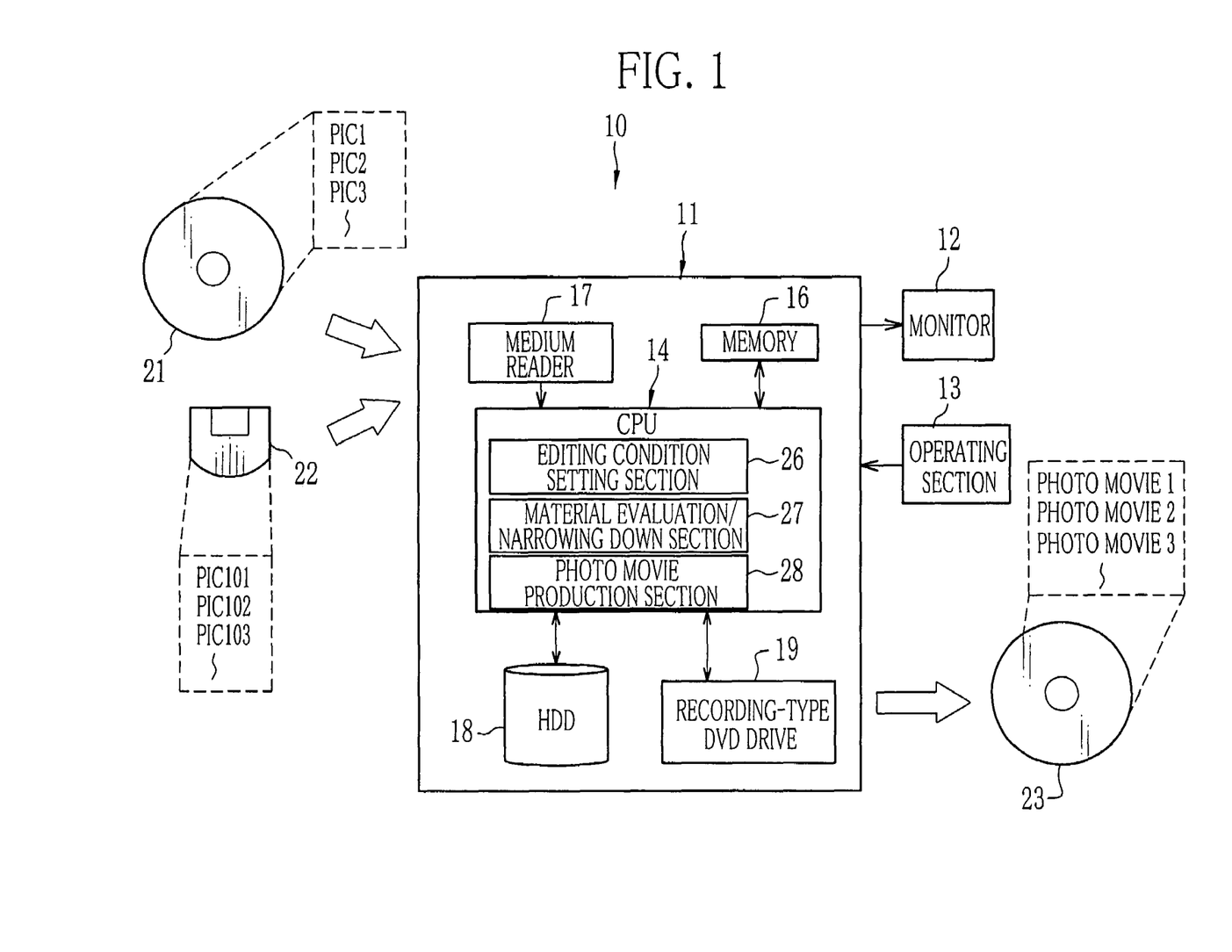
FIG. 1 is a block diagram of an image edition/compile apparatus 10.

In FIG. 1, an image edition/compile apparatus 10 captures still image data (PIC) stored in, for example, various types of optical recording medium 21 such as a CD and DVD and recording media such as a memory card 22, produces the photo movie on the basis of the data, and writes a photo movie or image sequence into, for example, a DVD medium 23. The image edition/compile apparatus 10 is installed in, for example, a photo shop or a convenience store which provides service for printing photographs or writing digital data on the recording medium, and is operated by a user who brings in photographic data (still image data) data or an operator such as a shop clerk.

The image edition/compile apparatus 10 includes a main unit 11, a monitor 12, and an operating section 13. In the main unit 11 an image editing program is installed, with a general purpose personal computer or a workstation, for example, as a base. The main unit 11 includes a CPU 14, a memory 16, a medium reader 17, a hard disk drive (HDD) 18, and a recording-type DVD drive 19. The CPU 14 controls over sections of the apparatus in accordance with an operating system.

The medium reader 17 reads data from the optical recording medium 21 or the memory card 22. On the monitor 12, an operation screen of an image editing program or a still image which is read is displayed. The operating section 13 is an input device for inputting an operational command into the image edition/compile apparatus 10 and includes a mouse and a keyboard. The recording-type DVD drive 19 is a disk drive as a writer for writing the data on the DVD medium 23.

As the DVD medium 23, there are various types of physical formats such as a DVD-R and DVD+R, as a nonrewritable type, and a DVD-RW, DVD+RW, and DVD-RAM, as a rewritable type. Besides, as a data recording format for determining a file format and a data storing format in recording on each of such media, there are formats such as a DVD-VIDEO format, a DVD-VR (Video Recording) format, and the like. Any of such formats can be used, however, in view of the convenience of an orderer or customer, a combination with the least device dependency on reproduction equipment is ideal.

Thus, the image edition/compile apparatus 10 uses a DVD-R medium. The image edition/compile apparatus 10 uses a DVD-VIDEO format as the data recording format. Because such combination of formats makes it possible to reproduce on most of products such as a DVD drive built in in a computer or a DVD player, which is considered as one of household electric appliances, a photo movie can be viewed on a television set placed in the living room of a home. Of course, it is not necessary to use a DVD as the recording medium. A next-generation recording medium which is expected to become widespread such as Blu-ray (registered trademark), as well as existing recording media such as a CD medium, may be used. Further, it is possible that the orderer selects from among a plurality of types of the recording medium at the desire of the orderer.

Figure 2:
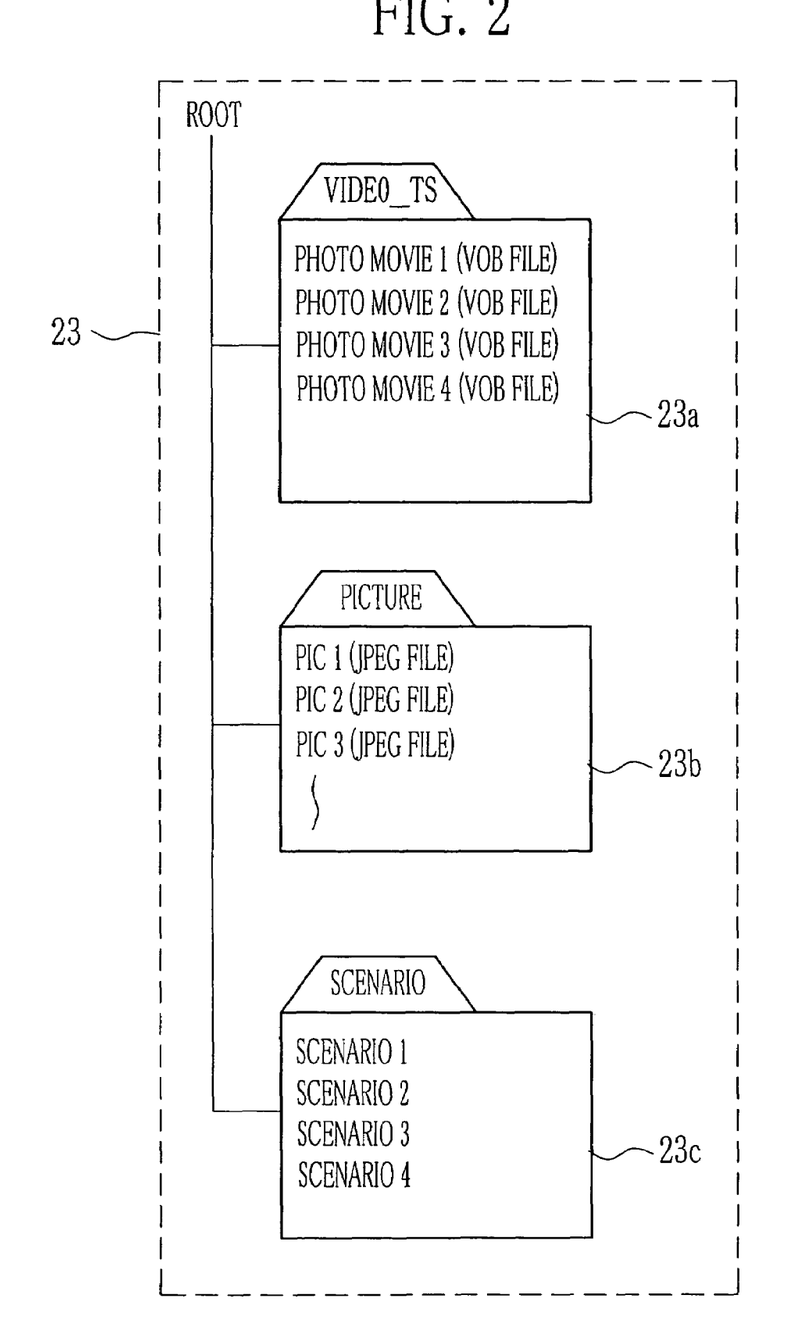
FIG. 2 is an explanatory view of the form of storing a photo movie into a medium.

In FIG. 2, in the case of the DVD-VIDEO format, the produced photo movie is stored in the format of a VOB file in a VIDEO$_{13}$TS folder 23a. A VOB file is a file in which a motion picture file encoded in an MPEG2 format, a common compression format of a motion picture, is converted in accordance with the DVD-VIDEO format.

On the DVD medium 23, the still image data (PIC) used as materials of the photo movie and a scenario file are, as well as the produced photo movie, stored respectively in a picture folder 23b and a scenario folder 23c. The still image data is a file of a JPEG format, which is a file format for compressing and storing data. Of course, the still image data may be of a non-compressed file format. The still image data is usually of a pixel number of 3,000,000 pixels.

The scenario file, as mentioned below, is a file in which an editing (graphically modifying, combining, and the like of the image) condition is recorded in a chronological order. The photo movie is produced in accordance with the editing condition described in the scenario file, however, the produced photo movie file is complete as a motion picture file independent of the scenario file, and the scenario file is not necessary in reproducing the photo movie file. The purpose of recording the scenario file on the DVD medium 23 is not for reproducing the photo movie but for use at a later date by an orderer who viewed the photo movie in printing favorite frames within the photo movie. The pixel number of one frame of a motion picture is rather small for use in printing. The data for printing, for example in the case of L-size printing, is of 2,024×1,536 pixels, and one frame of the photo movie is of 640×480 pixels. If the scenario file is recorded as well as the still image data used as the material, it becomes possible to regenerate as one frame the data for printing of high resolution from the still image data, on the basis of the recorded still image data and the scenario file.

In the HDD 18, the operating system and the image editing program are stored. The CPU 14 loads the image editing program into the memory 16 and performs a processing step described in the program. Thus, the CPU 14 functions as an editing condition setting section 26, a material evaluation/narrowing down section 27, and a photo movie production section 28, which respectively correspond to an execution section of each processing step.

The editing condition setting section 26 sets the editing condition of the photo movie. The editing condition setting section 26 displays an editing condition input screen on the monitor 12, receives the editing condition inputted by the operator, and sets the editing condition. The material evaluation/narrowing down section 27 evaluates a framing and an image quality of the still image data to be the material of the photo movie and finely restricts the material of the photo movie. The scenario file is determined finally by the inputted editing condition and the narrowing down of the material. The photo movie production section 28 produces the photo movie on the basis of the determined scenario file.

Further, in the HDD 18, various types of adjunct data used in the image editing program are also stored. The adjunct data includes a pattern or decorative image which decorates the still image to be the material by being combined with the still image. The decorative image includes a mask image, which covers an unnecessary part of a targeted image, and a template image, in which a fitting frame of the targeted image is determined and which is decorated with an illustration and the like. The decorative image adds color to the frame of the photo movie by decorating a background of the still image to be the material and by adding decoration in one spot.

Figure 3:
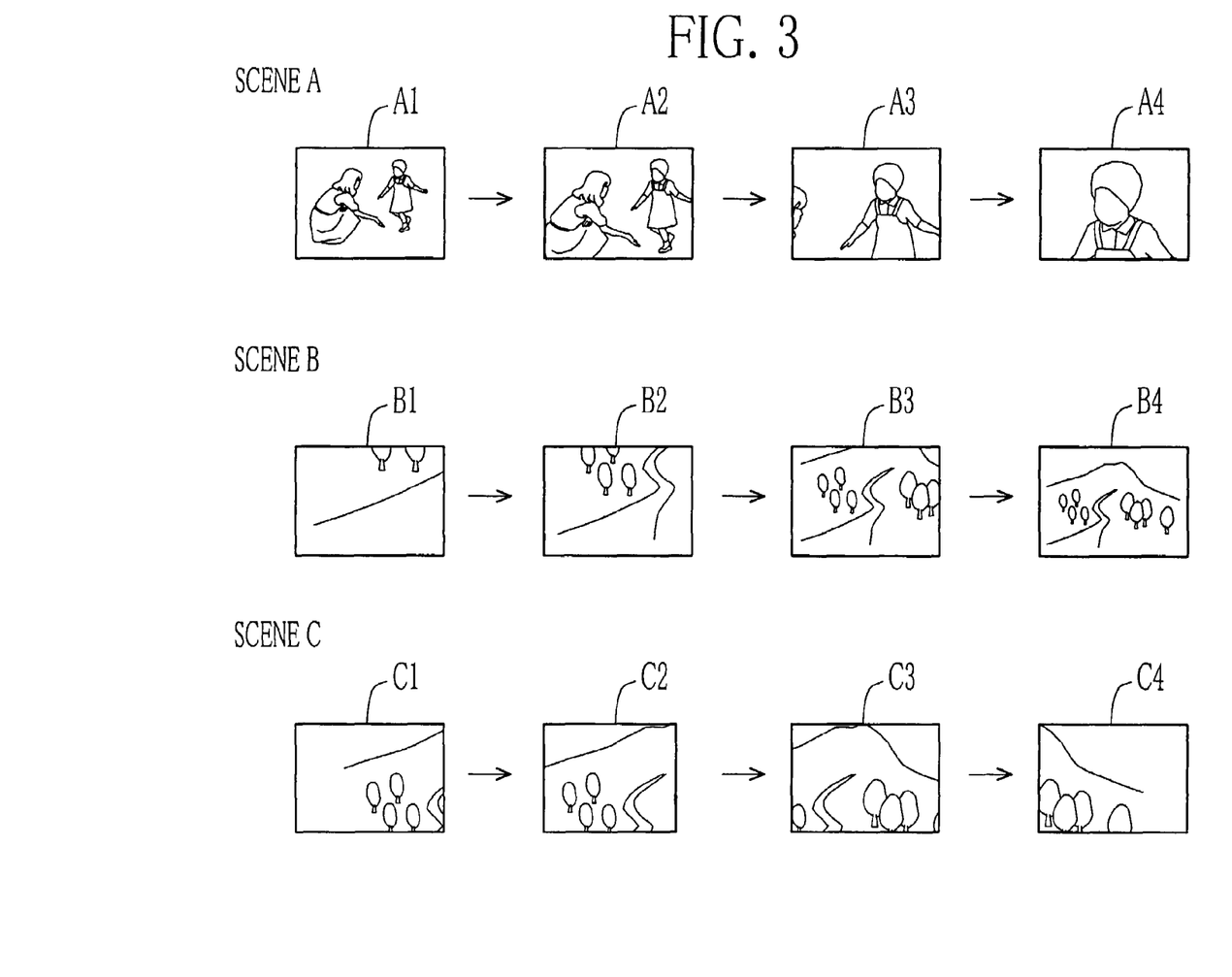
FIG. 3 is an explanatory view of a special effect applied to the photo movie.
Figure 4:
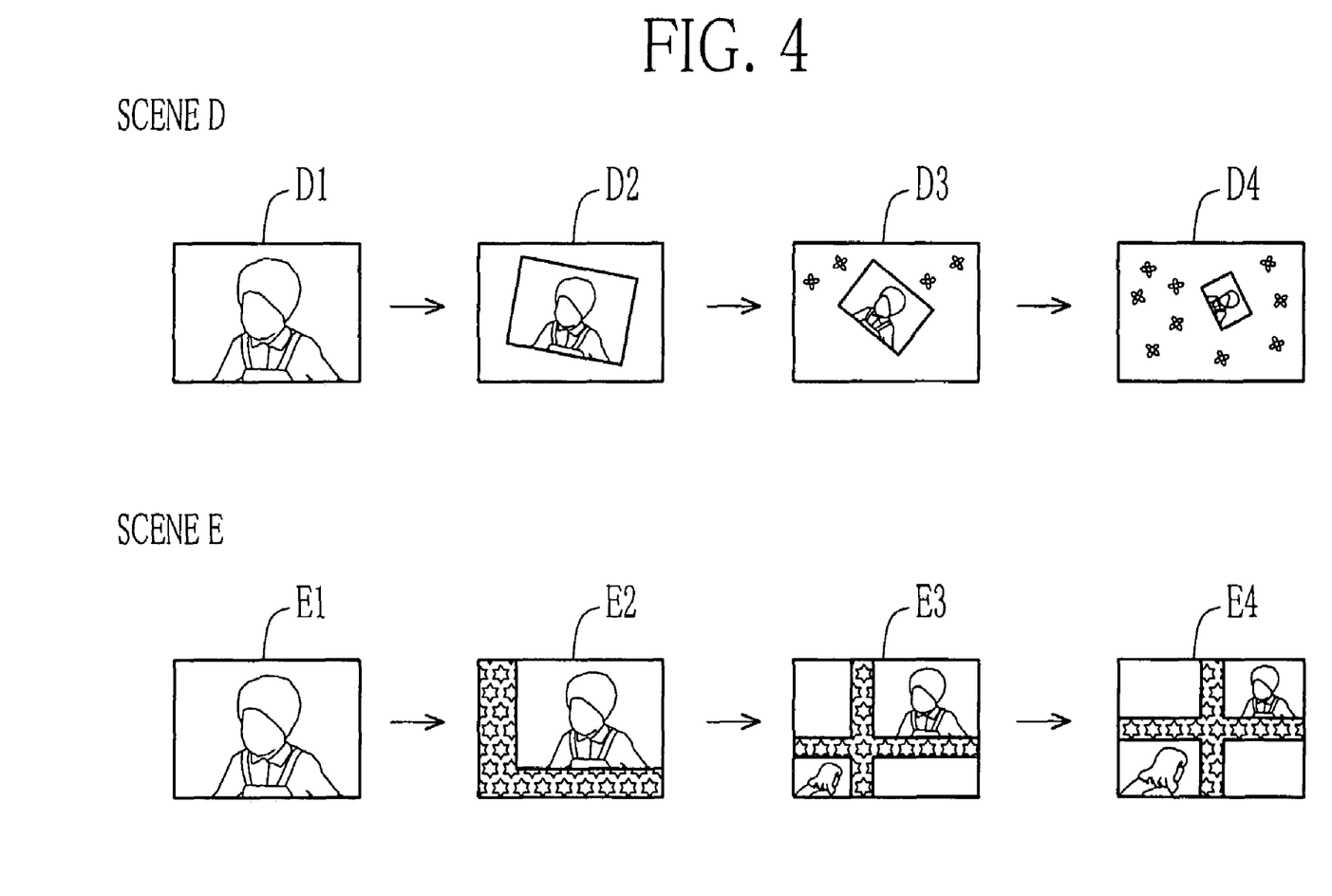
FIG. 4 is an explanatory view of the other special effects than the special effects shown in FIG. 3.

As shown in FIGS. 3 and 4, in producing the photo movie, a special effect such as an electronic zooming processing and a panning processing is provided by modifying and editing the still image to be the material. Scenes A to E are explanatory views showing examples of special effects. The scene A is a scene which begins with a frame A1 of a parent and a child, continues to a frame A2 and a frame A3 which focus on the face of the child and gradually zoom up such part, and ends with a frame A4 which is a close-up of the face of the child. Each frame A1 to A4 constituting the scene A is formed by setting a zoom point at a portion of an original image (still image) corresponding to the frame A1, performing an electronic zooming processing to such portion, and cropping from the original image a partial image of which the magnification is different.

The scene B is a scene which begins with a frame B1 of a surface of a road, then gradually zooms out to end with a frame B4 which shows a mountain lying on the extension of the road in a long-distance view. Also, each frame B1 to B4 constituting the scene B is formed, as in the case of the scene A, by setting a zoom point at a portion of an original image (still image) corresponding to the frame B4, performing an electronic zooming processing to such portion, and cropping from the original image a partial image of which the magnification is different. Because in the scene B, zoom-out is performed from the zoom point, contrary to the scene A in which zoom-in is performed to the zoom point, the zoom magnification of the frame B1, the frame which is inserted first, is the highest, and the zoom magnification of the frame B4, the frame which is inserted last, is the same as the original image.

The scene C is a scene which begins with a frame C1 showing the left foot of a mountain which is the main subject as if a camera were panned horizontally, in order to obtain a panoramic effect, then continues to a frame C2 and a frame C3 showing the mountain positioned in the center of a screen, and ends with a frame C4 which shows the right foot of the mountain. Each frame C1 to C4 is formed by cropping a part of a still image showing the whole mountain in a long distance view, moving a point from left to right.

The scene D is a scene which begins with a frame D1 showing a close-up of a face of a child and continues to frames D2, D3, and D4 in which the image is reduced and rotated to gradually fade out from the screen. In the frames D3 and D4, flowers move with shakes or randomly in the background of the image.

In the scene E, a frame E1 showing a child is gradually reduced, with the top-right of the window being a base point, and an image showing a mother is inserted in the screen with being gradually enlarged from the bottom-left of the frame. A boundary of each image is decorated with a cross-shaped band with a star pattern, and the band is inserted from the bottom-left corner of the screen in accordance with the enlargement of the image showing the mother. In this embodiment, for the sake of convenience, explanation is made as if four frames should constitute each scene. However, in fact, there are more frames for one scene. For example, each scene is constituted with a frame rate of about 30 frames per second.

The photo movie is produced by joining together such scenes. The editing condition of the photo movie is described in a scenario file 36 shown in FIG. 5. In the scenario file 36, the editing condition per each frame is determined along with a time axis. The editing condition includes an ID of the image to be used as the material, an ID of the decorative image, type of the special effect, and the like. In the scenario file 36, with the time axis being set on a horizontal axis, what special effect is to be added and which image is designated is determined in accordance with the time stamp of each frame.

Figure 5:
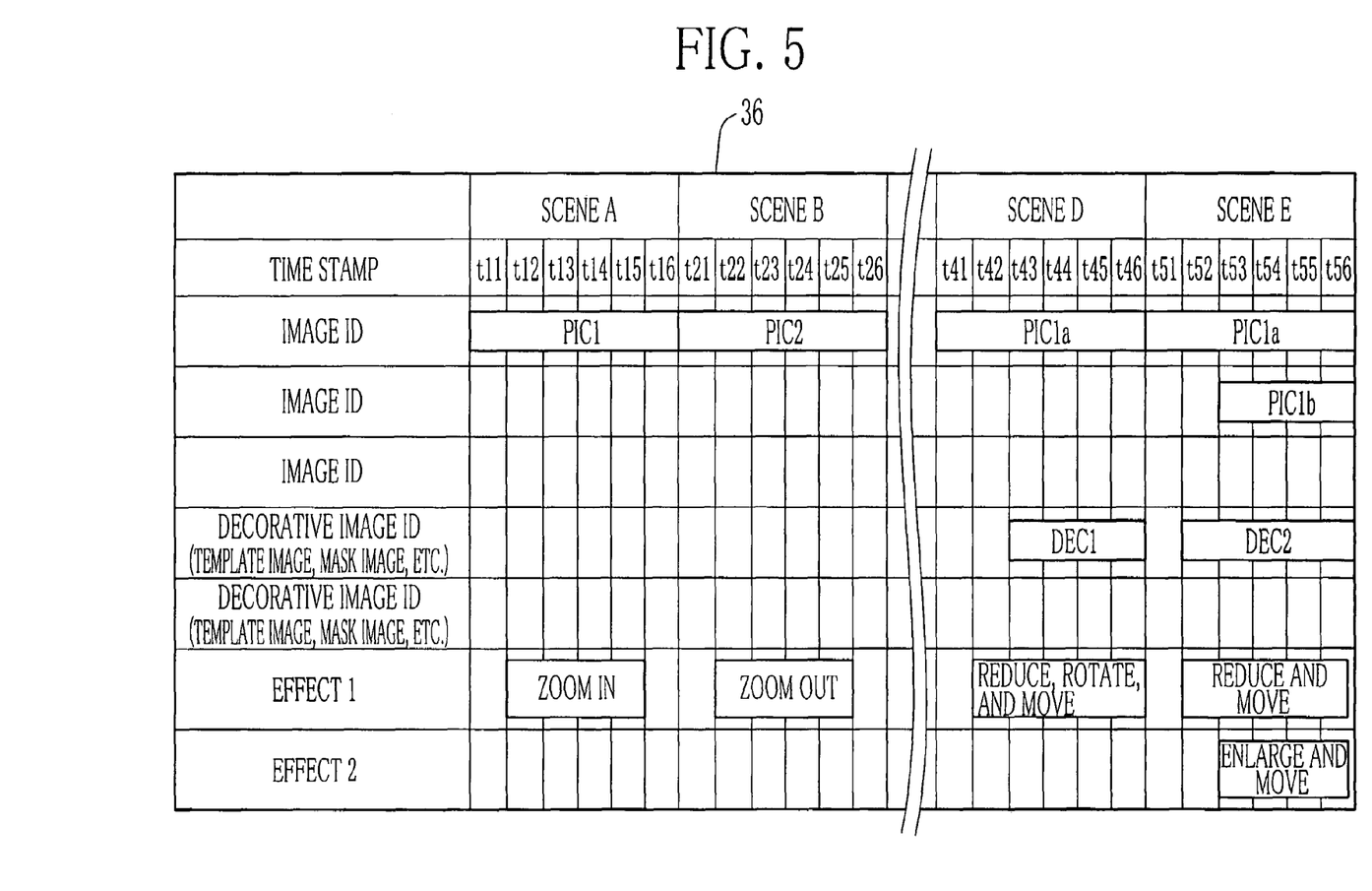
FIG. 5 is an explanatory view of a scenario file.

For example, as in the case of the scene A, a zoom-in processing is applied all over the scene using an image PIC 1. As in the case of the scene D, using an image PIC 1a obtained by cropping the image PIC 1, the special effect is applied which rotates the image PIC 1a while reducing and moving the same. As in the case of the scene E, at first the image PIC 1a is displayed alone and an image PIC 1b is inserted with a delay. Of course, the scenario file 36 described in this embodiment is merely an example, and there may be various other forms. The scenario file 36 actually includes the detailed data such as the zoom point which indicates the base point of zooming, a zoom magnification, coordinate data which indicates a position of moving, an angle of rotation, and an insertion position of the decorative image.

Figure 6:
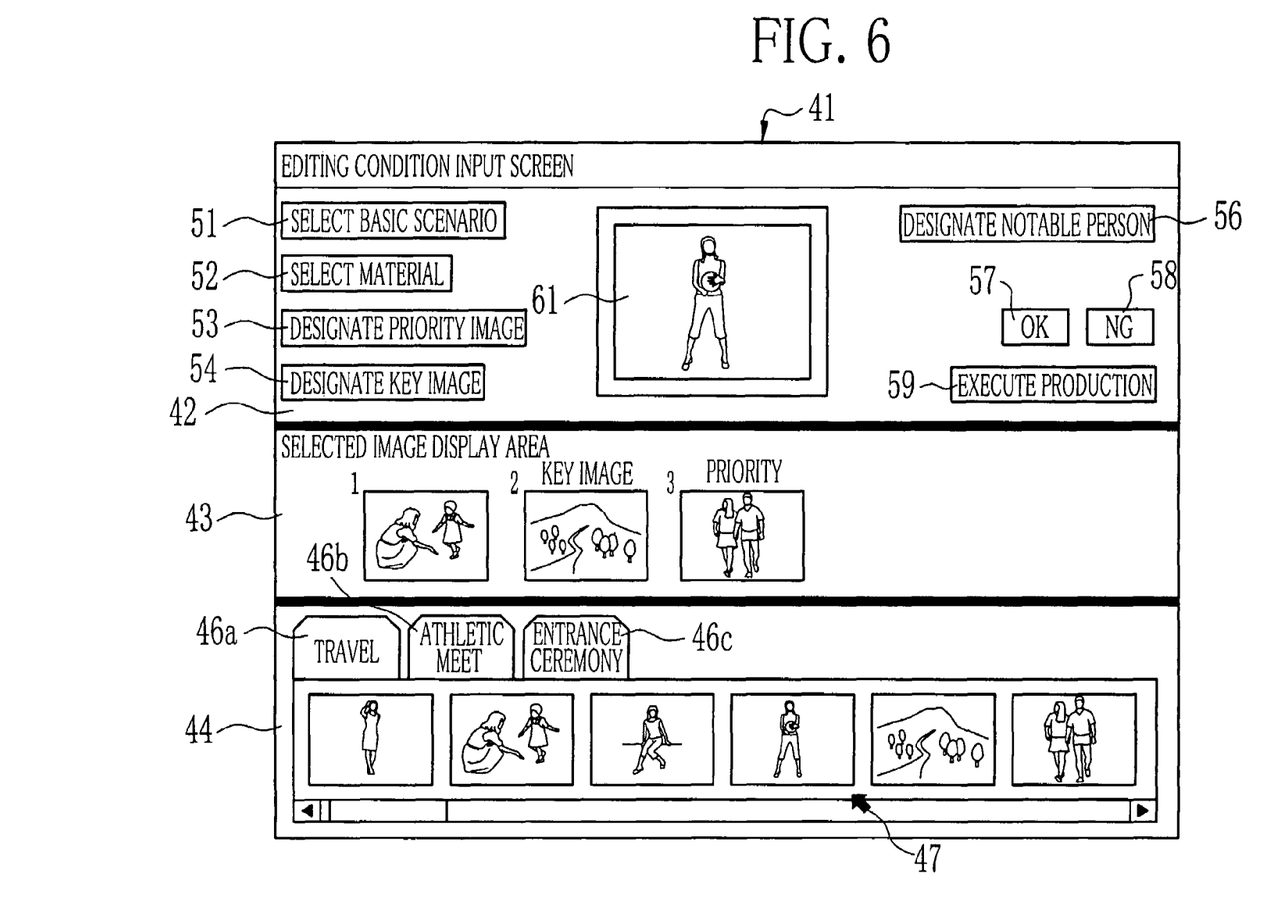
FIG. 6 is an explanatory view of an editing condition input screen.

FIG. 6 shows an editing condition input screen 41 of the image editing program. The editing condition of the photo movie is inputted via the editing condition input screen 41. The editing condition input screen 41 is divided into three areas, namely, a display area for operation section 42, a selected image display area 43, and an area 44 for displaying images recorded on media, from an upper part to a lower part of the screen.

The area 44 for displaying images recorded on media is an area in which an image stored on the recording medium set in the medium reader 17 is displayed. When the editing condition input screen 41 is started up, the medium reader 17 reads out the image data stored on the recording medium and a thumbnail image of the read-out image data is displayed in the area 44 for displaying images recorded on media. If a folder is created per each image category such as travel, athletic meet, entrance ceremony, and the like, the image is displayed per each folder. A name of each folder is displayed in tabs 46a, 46b, and 46c. When any of tabs 46a to 46c is clicked by a pointer 47 of a mouse, a folder corresponding to the clicked tab becomes active and the thumbnail image of the image within the folder is displayed.

The selected image display area 43 is an area in which an image selected by the orderer as an image desired as the material of the photo movie from among images on the recording medium is displayed. An operation of selecting an image is operated by moving the pointer 47 over the image displayed in the area 44 for displaying images recorded on media and dragging such image to the selected image display area 43 by mousing.

Provided in the display area for operation section 42 are respective operation buttons such as a basic scenario selection button 51, a material selection button 52, a priority image designation button 53, a key image designation button 54, a notable person designation button 56, an OK button 57, an NG button 58, and a production execution button 59 and a magnified display area 61 which enlarges and displays the image pointed by the pointer 47.

Figure 7:
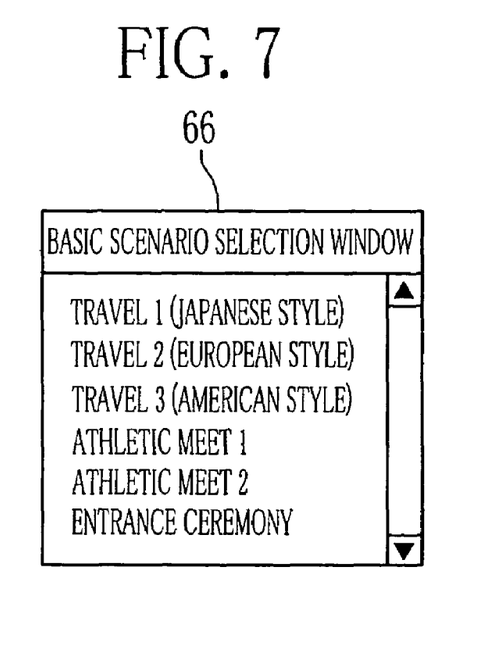
FIG. 7 is an explanatory view of a basic scenario selecting window.

The basic scenario selection button 51 is a button for selecting a basic scenario file provided in advance as a basic scenario of the photo movie. When the button 51 is clicked, a subwindow (basic scenario selection window) 66 shown in FIG. 7 is displayed. In the subwindow 66, a list of the basic scenario file provided in advance is displayed. The scenario file is selected by clicking any file among the list.

The basic scenario file is provided per category of photographs such as travel, athletic meet, and entrance ceremony, and a basic editing condition is determined in advance for each file and has information of prescribed condition of editing. Further, BGM (background music) corresponding to each basic scenario file is associated with the basic scenario file, and when the basic scenario file is selected, the BGM is automatically selected. For example, for the basic scenario file of travel, relatively slow BGM is selected. Besides, also, as for an effect such as zooming or panning, which provides motion in a photograph, the editing condition is determined so that the photograph moves slowly to the tempo of the selected BGM. Further, the basic scenario file of travel is provided per each destination of travel and the BGM and the pattern or decorative image can be changed in accordance with each such destination. The BGM and the decorative image, in which an individual's taste is strongly reflected, may of course be made changeable according to orderer's taste.

The material selection button 52 is a button for beginning selection of the image the orderer desires as the material of the photo movie from among the images recorded on the recording medium. When the button 52 is clicked, the abovementioned dragging of image from the area 44 for displaying images recorded on media to the selected image display area 43 becomes possible.

The priority image designation button 53 is a button for designating an image especially desired to be used by priority from among images designated by selection of material. When priority is designated, "PRIORITY" mark is displayed on the designated image. As for the image which priority is designated to, compared to other selected images, assigned time in the photo movie becomes longer by being displayed more times repeatedly and by being displayed for a longer period of time in one scene.

The key image designation button 54 is a button for designating a representative image used for an important scene such as a climactic scene or a title scene of the photo movie. When a key image is designated, just as in the case of priority designation, "KEY IMAGE" mark is displayed on the designated image. The photo movie is edited with treating the key image as the most important image.

In the case where there is a photograph which the orderer has a special fondness for or which is more memorable than others among the selected still images, by handling such images specially and differently than other images by the abovementioned priority designation and key image designation, the quality of the photo movie becomes more impressive.

The notable person designation button 56 is a button for designating a most notable person among subjects shown in the selected images. A notable person is designated by clicking the button 56 and then pointing on an image including the notable person among images within the selected image display area 43. In designating the notable person, the CPU 14 analyzes an image content by utilizing face recognition technology and discriminates a specific person in the image. In editing the photo movie, the zoom point is set at the designated person and the image including the notable person is handled so that such image is used more preferentially compared to other images.

Figure 8:
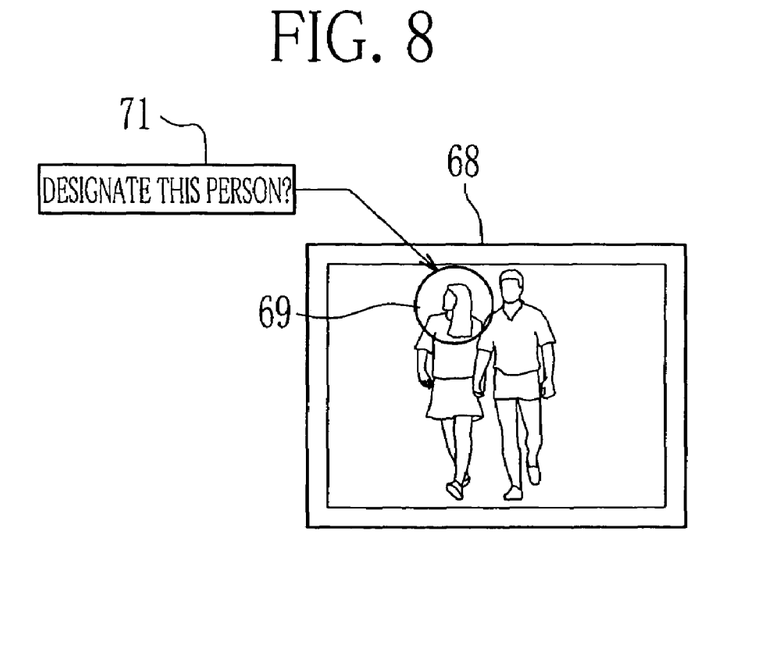
FIG. 8 is an explanatory view of a notable person designation method.

Further, as shown in FIG. 8, in the case where a plurality of persons is included in an image 68, a feature indicator 69 of a circle is displayed around the face of one person and a final confirmation message 71, which requests confirmation with the operator "Designate this person?" and the like, is displayed. If the person is to be designated, the operator clicks the OK button 57. If the person is not to be designated, the operator clicks the NG button 58. When the NG button 58 is clicked, the feature indicator 69 moves to the other person.

The editing condition inputted in this way is added to the selected basic scenario file and is set by the editing condition setting section 26. When the production execution button 59 is clicked, the material evaluation/narrowing down section 27 performs a material evaluation/narrowing down processing on the basis of the editing condition, before the photo movie production processing begins.

In the material evaluation/narrowing down processing, first, the original image data of the image selected as the material from among the images on the recording medium is captured. Then the selected image is analyzed and the image to which the notable person designation is made is narrowed down and extracted. Then, a specially selected image including the extracted image of the notable person and the image to which key image designation and priority designation is made is discriminated from other generally selected images.

After that, the selected image is evaluated. As mentioned above, in editing the photo movie, evaluation is performed of whether the selected image has a quality capable of undergoing electronic zooming processing or panning processing because cropping of the image is often used when such processing is performed. The criterion of evaluation of image quality is, for example, whether a pixel number satisfies a predetermined value or whether the image is in good focus, and the like. Especially, as for the specially selected image, because cropping is performed very often, the quality of the photo movie can be improved by narrowing down the material by performing such evaluation.

In addition, in the case where reproduction time is determined in the basic scenario file, the reproduction time is assigned for the specially selected image by priority and the remaining reproduction time is assigned for the generally selected images. Among the generally selected images, the images satisfying a predetermined standard of image quality are used by priority.

Further, in the material evaluation/narrowing down processing, framing analysis is also performed. Framing analysis is to survey the framing of the photograph by analysis on the image data, and is performed in order, for example, to set the zoom point. For example, in the case of the photograph showing a mountain in a long distance view of a road, which is used in the above-mentioned scene B and scene C, it is considered that a special effect which makes the best possible use of the material is to zoom along the road. By analyzing the framing and setting the zoom point suitable to the framing, the quality of the photo movie can be further improved.

After such material evaluation/narrowing down processing is completed, the scenario file is formed on the basis of the editing condition. Then, after a setup such as color tone correction and γ-correction of the image to be the material is performed, a photo movie production processing is performed on the basis of the scenario file. The photo movie production section 28 forms the frame constituting each scene of the photo movie from the image data of the selected image, in accordance with the scenario file, encodes the formed frame into an MPEG format, and produces one photo movie.

The produced photo movie is written out to the DVD medium 23 in the DVD-VIDEO format via the recording-type DVD drive 19. On the DVD medium 23, the still image data used as the material and the scenario file are recorded as well as the photo movie. In the case where there is a plurality of photo movies, the still image data and the scenario file are recorded in association with each photo movie.

Figure 9:
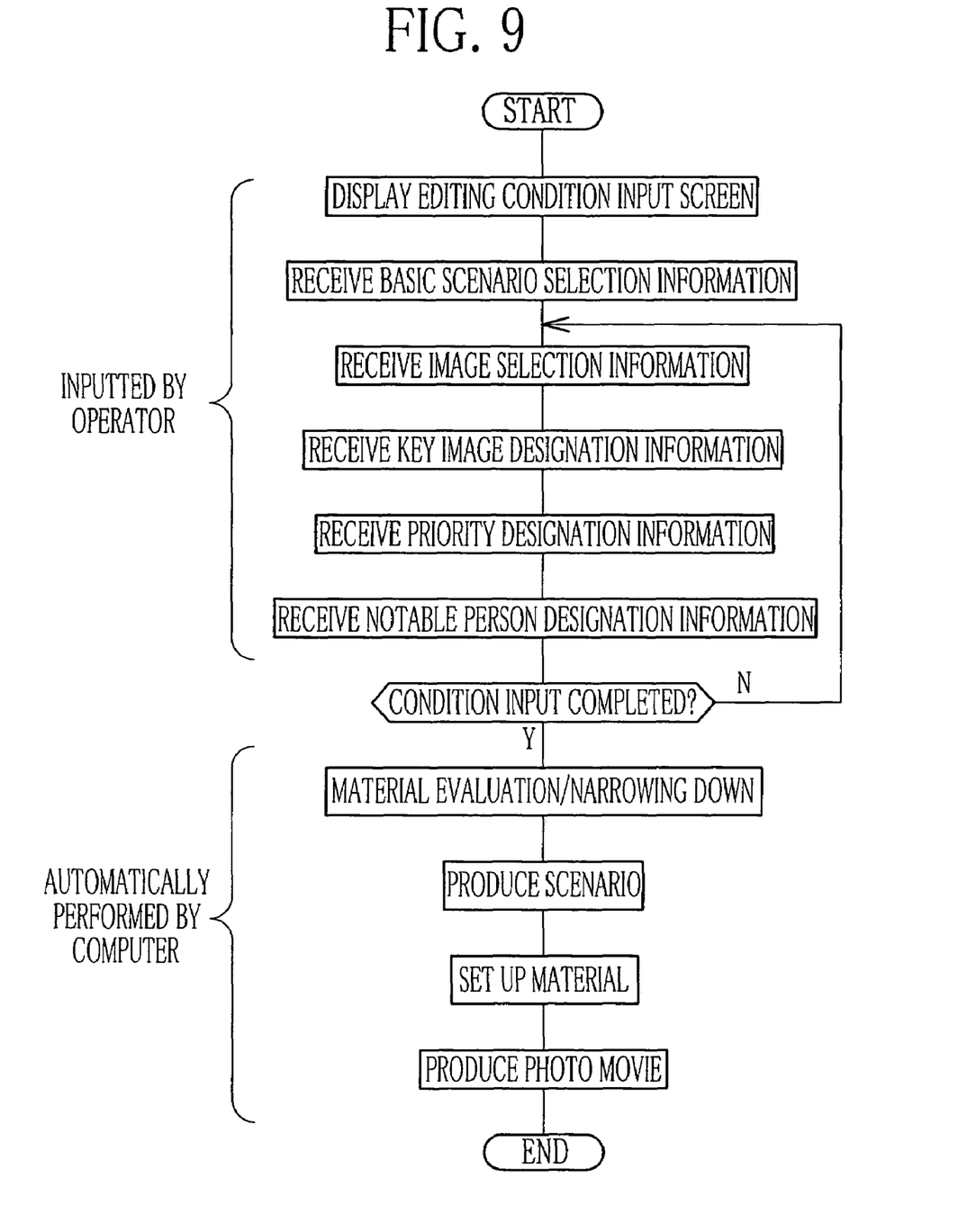
FIG. 9 is a flow chart showing an editing condition input step.

Hereafter, the operation according to the above constitution will be explained referring to the flow chart of FIG. 9. The operator of the image edition/compile apparatus 10 sets a recording medium which is brought in in the medium reader 17 and starts up the image editing program. When the image editing program is started up, the editing condition setting section 26 outputs the editing condition input screen 41 to the monitor 12. The operator inputs the editing condition desired by the orderer or customer via the editing condition input screen 41. Then basic scenario selection information, selection information of the image to be the material, key image designation information, priority designation information, and notable person designation information are inputted sequentially, and if there is any change, change is made, and if there is no change, the production execution button 59 is clicked. Thereby the editing condition setting section 26 adds and sets the inputted editing condition in to the basic scenario file.

When the production execution button 59 is clicked, the material evaluation/narrowing down section 27 evaluates and finely restricts the material, and the scenario is determined. Then, after the material is set up, the photo movie production section 28 produces the photo movie as image sequence on the basis of the determined scenario. The produced photo movie is written out by the recording-type DVD drive 19 as writer and is provided to the orderer.

The photo movie produced in this way is edited on the basis of the editing conditions such as priority designation, key image designation, and notable person designation, that is, in the title scene and the climactic scene, key image is used, the image of the notable person is displayed more number of times than others, and the zoom point is set at the notable person. Consequently, the photo movie of remarkably high quality can be provided, with the scene being dynamic and a plot becoming clear, compared to a conventional method in which all the images are handled equally in editing. Further, because the editing condition to be inputted is limited to conditions determining the policy of editing such as key image designation, priority designation, and notable person designation, complication of operation can be avoided compared to a conventional method in which a special effect is designated for each individual image.

In the above embodiment, the range of selected image, key image designation, priority designation, and notable person designation are described as inputtable editing conditions, however, because it is better if there are more such editing conditions in order to pursuit improvement of the quality of the photo movie, an editing condition other than such conditions may be added. However, in view of the easiness of operation, a smaller number of such editing conditions may be preferable. For this reason, it is not necessary to include all such conditions, and the constitution which includes any one of the above editing conditions is also possible. Even by such constitution, the quality of the photo movie can be sufficiently secured if other editing conditions are determined automatically on the basis of the inputted editing condition. For example, in the case where key image designation is made, the designated image can be made to be used by priority by automatically extracting other images related to the content of the designated image (for example, the person). The plot of the photo movie is secured as the photo movie focusing on a certain person.

In the above embodiment, the scenario file and the still image data, as well as the photo movie, are recorded on the DVD medium provided to the orderer, however, it is possible not to record the scenario file and the still image data and record only the photo movie.

In the above embodiment, the present invention is explained as the embodiment in which the image edition/compile apparatus is installed in a store such as a photo shop, however, in the present invention, the image edition/compile apparatus may be implemented by installation by an individual of the image editing program into his/her PC. Besides, the image edition/compile apparatus may be implemented by hardware, not by software.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An image edition/compile apparatus for producing a photo movie by editing still images comprising:
   a storage section for storing a plurality of types of basic scenario in which a basic editing condition of said photo movie is determined;
   a basic scenario selecting section for selecting a basic scenario from among said plurality of types of said basic scenario;
   a reader for reading plural still images from a recording medium;
   an image selecting section for selecting one or more desired still images from among said still images;
   an editing condition setting section for adding said editing condition to said basic scenario, said editing condition to be added including at least one of priority designation information for designating said still image to be used with priority to other still images among said selected still images, and key image designation information for designating a key image to be used in an important scene of said photo movie;

an extraction section for extracting said still image including a notable person as a subject, by analyzing said still image, on the basis of notable person designation information for designating said notable person, said notable person designation information being added to said basic scenario by said editing condition setting section; and a photo movie production section for producing said photo movie on the basis of said basic scenario and said editing condition to be added.

2. An image edition/compile apparatus for producing a photo movie by editing still images comprising:

a storage section for storing a plurality of types of basic scenario in which a basic editing condition of said photo movie is determined;

a basic scenario selecting section for selecting a basic scenario from among said plurality of types of said basic scenario;

a reader for reading plural still images from a recording medium; an image selecting section for selecting one or more desired still images from among said still images;

an editing condition setting section for adding said editing condition to said basic scenario, said editing condition to be added including at least one of priority designation information for designating said still image to be used with priority to other still images among said selected still images, and key image designation information for designating a key image to be used in an important scene of said photo movie;

an evaluation section for evaluating an image quality of said selected still images and determining whether the image quality satisfies a predetermined criterion;

a narrowing down section for narrowing down a still image to be used for said photo movie from among said selected still images, on the basis of a result of said evaluation and said editing condition to be added; and a photo movie production section for producing said photo movie on the basis of said basic scenario and said editing condition to be added.

3. An image editing method of producing a photo movie by editing still images comprising the steps of:

selecting one basic scenario from among plural types of basic scenario, said basic scenario including a basic editing condition of said photo movie;

reading said still images from a recording medium with the medium reader;

selecting one or more desired still images from said still images;

adding said editing condition to said basic scenario, said editing condition to be added including at least one of priority designation information for designating said still image to be used with priority to other still images among said selected still images, and key image designation information for designating a key image to be used in an important scene of said photo movie;

extracting a still image including a notable person as a subject, by analyzing said still image, on the basis of notable person designation information for designating said notable person, said notable person designation information being added to said basic scenario by said editing condition setting section; and producing said photo movie on the basis of said basic scenario and said editing condition to be added.

4. An image editing method of producing a photo movie by editing still images comprising the steps of:

selecting one basic scenario from among plural types of basic scenario, said basic scenario including a basic editing condition of said photo movie;

reading said still images from a recording medium with the medium reader;

selecting one or more desired still images from said still images;

adding said editing condition to said basic scenario, said editing condition to be added including at least one of priority designation information for designating said still image to be used with priority to other still images among said selected still images, and key image designation information for designating a key image to be used in an important scene of said photo movie;

evaluating an image quality of said selected still images and determining whether the image quality satisfies a predetermined criterion;

narrowing down a still image to be used for said photo movie from among said selected still images, on the basis of a result of said evaluation and said editing condition to be added; and producing said photo movie on the basis of said basic scenario and said editing condition to be added.

* * * * *